United States Patent [19]

Grinberg et al.

[11] 4,049,389
[45] Sept. 20, 1977

[54] METHOD AND APPARATUS FOR ASSEMBLING AEROSOL VALVE

[76] Inventors: Ijun Iosifovich Grinberg, ulitsa Zavodskaya, 4a, kv. 42; Evgeny Kuzmich Zhukov, ulitsa Fevralskaya, 1, kv. 14, both of Klimovsk Moskovskoi oblasti; Lev Nikolaevich Koshkin, 3 Samotechny pereulok, 23, kv. 54, Moscow, all of U.S.S.R.

[21] Appl. No.: 676,655

[22] Filed: Apr. 13, 1976

[51] Int. Cl.² .......................................... B23P 23/00
[52] U.S. Cl. .................... 29/157.1 R; 29/430; 29/469; 29/783; 29/788; 29/792; 29/793; 29/796; 29/33 K
[58] Field of Search ............... 29/157.1 R, 430, 469, 29/213 R, 771, 783, 785, 788, 791–793, 796, 33 J, 33 K, 33 P

[56] References Cited

U.S. PATENT DOCUMENTS

| | | | |
|---|---|---|---|
| 2,506,175 | 5/1950 | Reynolds et al. | 10/162 R |
| 3,015,155 | 1/1962 | Dobson et al. | 29/783 |
| 3,040,515 | 6/1962 | Mueller et al. | 29/788 |
| 3,163,927 | 1/1965 | Brosseit | 29/792 |
| 3,209,441 | 10/1965 | Ducharme et al. | 29/771 |
| 3,267,567 | 8/1966 | Shields | 29/785 |
| 3,849,850 | 11/1974 | Goutard | 29/783 |

Primary Examiner—C.W. Lanham
Assistant Examiner—Daniel C. Crane
Attorney, Agent, or Firm—Haseltine, Lake & Waters

[57] ABSTRACT

A method and apparatus for assembling an aerosol valve which are intended to assemble a valve made up of a valve body, a spring, a stem, a sealing disk and valve cap. In assembling the valve, two vertically disposed sets formed in sequence are indicated by a first "sealing disk-valve cap" set and a second "valve body-spring-stem" set. The sets are disposed one above the other so that their original orientation is retained, and are brought together so as to place the components into a specified position relative to each other in the valve, then the sets are interlocked by deforming the valve cap. In the apparatus employing the method, namely in a mechanism for bringing the sets together, a tip adapted to grip, transfer and dispose the first set above the second one is provided. By virtue of such an arrangement, the assembling of valves involves a minimum of operations and a high-capacity apparatus has been developed.

10 Claims, 30 Drawing Figures

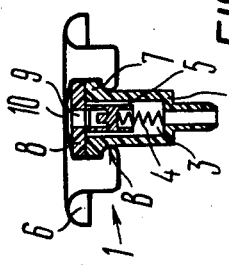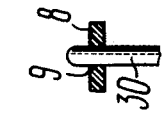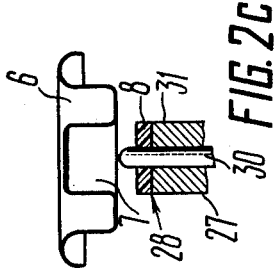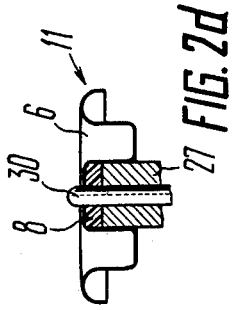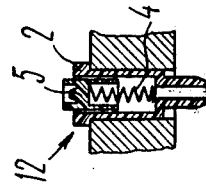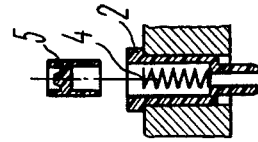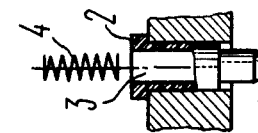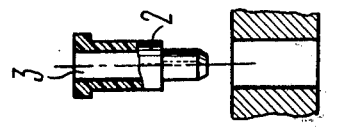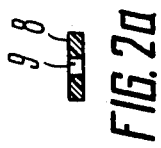

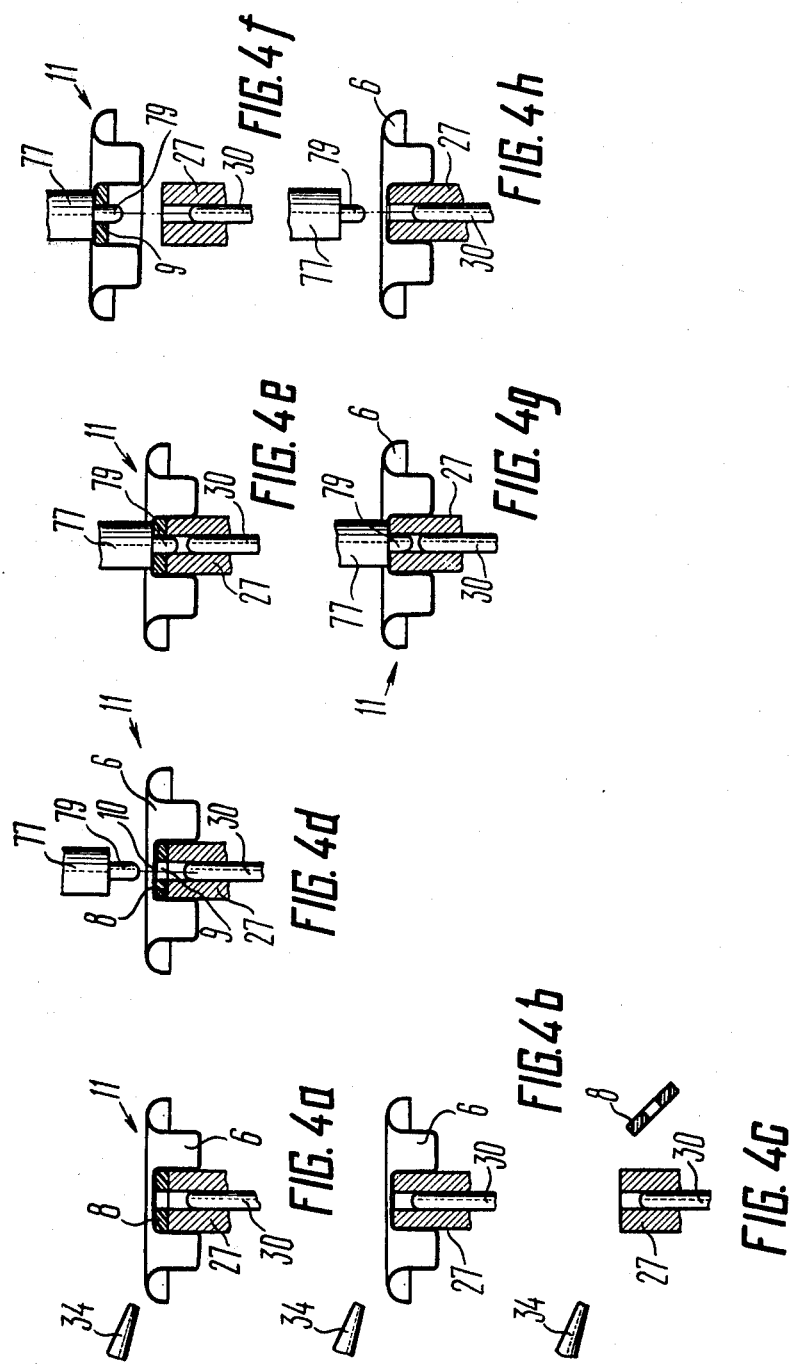

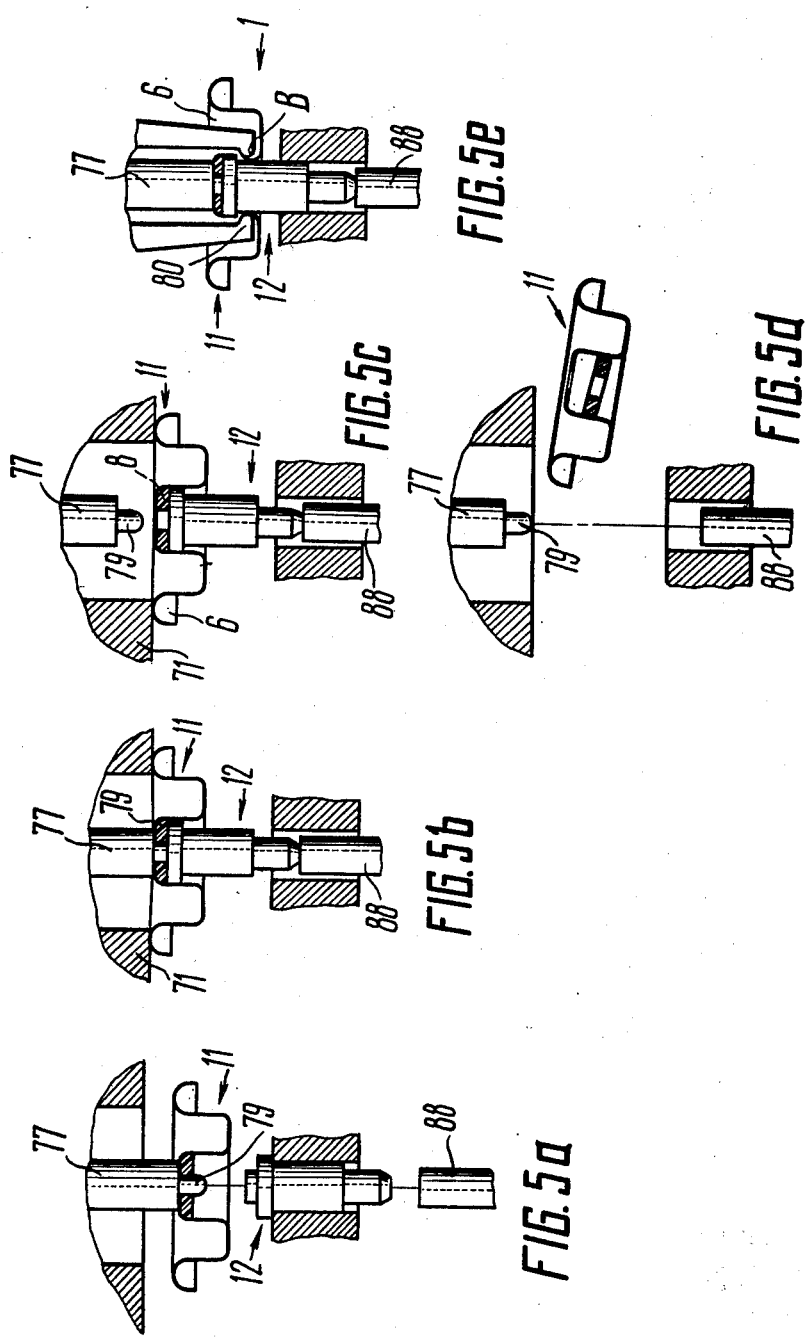

METHOD AND APPARATUS FOR ASSEMBLING
AEROSOL VALVE

BACKGROUND OF THE INVENTION

The present invention relates to a method and apparatus for assembling aerosol valves, and more specifically to a method and apparatus for assembling such aerosol valves which consist each of several components, viz., a valve body with a central hollow disposed wherein are disposed a spring and stem, a valve disk in a resilient material with a central bore accommodated on said stem in said hollow, a valve cap with a central aperture and a cavity, the diameter of the aperture being bigger than that of the bore of the disk. Disposed cavity in the is the valve disk and the top portion of said valve body, and the valve cap is rigidly attached to the valve body by deforming the valve cap.

Description Of The Prior Art

At present, known to the art is a method of assembling such aerosol valves formed of components comprising the valve is a first vertical "sealing disk-valve cap" set and a second vertical "valve body-spring-stem" set. The second set is disposed above the first one, both sets are brought together so as to place the components into the specified position relatively to each other in the valve and then the sets are interlinked into the valve by deforming the valve cap.

In forming the first "sealing disk-valve cap" set, the sealing disk is placed into the valve cap. This operation is a rather convenient one and assures a stable position of the valve disk in the valve cap. Simultaneously, the second "valve body-spring-stem" set is formed by placing the spring around the stem and, on changing the orientation of said assembly into a reverse one, the assembly is fitted into the valve body. It is quite natural that a tight fit of the spring to the stem is indispensable in this case. The second set so obtained is in a normal position, the spring with the stem being stably disposed in the valve body. Yet, the second set is disposed in in position which is a reverse relative to the position of the first set and, consequently, the second set is reoriented before being placed above the first set, and both sets are brought together so as to place the components into the specified position relative to each other in the valve. This cannot be accomplished unless the free end of the spring fits tightly to the valve body.

It is thus obvious that in embodying the known method the orientation of the elements assembled is to be changed more than once. This not only increases the number of operations but also slows down and complicates the assembling process as a whole. The need in tight fits between components of the second "valve bodyspring-stem" set required to cope with said changes in the orientation also complicates the assembling process let alone the difficulties encountered in fabricating the components proper.

Furthermore, if no valve body is present in the second set and no valve disk or valve cap is present in the first set, the valve incorporates are units made of components fitting each other tightly. These units are not suitable for further assembling and pose difficulties when being taken apart with the result that they are often scrapped, adding to the cost of production.

The apparatus embodying the known method incorporates a device for forming the first "sealing disk-valve cap" set and a device for forming the second "valve body-spring-stem" set, each of them being provided with a plurality of workholding fixtures spaced equidistantly apart and travelling over an endless horizontal path so as to receive the components of said sets in succession. This apparatus also incorporates a stationary device for disposing the second set above the first one with mechanisms for bringing the sets one towards the other and interlinking them into a finished valve.

Apart from that, the known apparatus is provided with an additional device for changing the orientation of the assembled second "valve body-spring-stem" sets and with means of assembling the components in the sets in a tightly-fitting manner. This poses a number of problems in engineering the apparatus and impairs the capacity of same.

SUMMARY OF INVENTION

The main object of the present invention is to provide a method and apparatus for assembling aerosol valve which eliminates the disadvantages of the prior art.

Another object of the present invention is to provide a method and apparatus for assembling an aerosol valve wherein the need in changing the orientation of the assembled sets is eliminated by utilizing the resilient properties of the sealing disk.

A further object of the present invention is to provide a method and apparatus for assembling an aerosol valve which eliminates the need to assemble the components in a tightly fitting manner with the result that the method of assembling an aerosol valve and the apparatus embodying same are substantially simplified.

These and other objects are attained by a method wherein a first vertically arranged "sealing disk-valve cap" set and a second vertically arranged "valve body-spring-stem" set are formed separately from the components comprising the valve, the sets are disposed one above the other, brought coaxially one towards the other so as to place the components into the specified position relatively to each other in the valve and then both these sets are interlinked into the valve by deforming the valve cap.

In this method the sets are formed, according to the invention, in sequence and in disposing the sets one above the other while their original orientation is retained; in forming the first set, the sealing disk is aligned by means of its bore and its ability to move downwards is constrained, the valve cap is fitted on the sealing disk which is then relieved of the aligning action, the first set is gripped through the intermediary of the bore of the sealing disk, the gripping action being performed from the top through an aperture in the valve cap, and is transferred so as to be stationed above the second set.

The fact that the first "sealing disk-valve cap" set and the second "valve body-spring-stem" set are formed in a sequence simplifies the assembling process, for all the components of the valve need to be oriented only once in the course of forming said sets, and this orientation is retained until the components are interlinked into the finished valve.

The aligning of the sealing disk by means of its bore combined with the constraining of the ability of the sealing disk to move downward assures accurate fixing of the sealing disk and allows the fitting of a valve cap on same. The relieving of the sealing disk from said aligning action provides for the gripping of the first set through the intermediary of the bore of the sealing disk, this gripping action being performed from the top through an aperture in the valve cap, so as to transfer said set into a position coaxially with the second set, by placing the first set above the second one. The gripping of the first set simultaneously performs another task which is the checking of the given set for the presence of the sealing disk therein, for, if no sealing disk is present, the valve cap will not be gripped and fed for further assembling.

In placing the valve cap on the sealing disk, it is preferred, in accordance with the invention, to align the valve cap by means of its cavity so as to assure a stable position of the "sealing disk-valve cap" set.

Preparatory to gripping from the top, it is preferred, in accordance with the invention, to apply a force to the first set sufficing to remove the sealing disk if no valve cap is available. This eliminates the possibility of gripping the sealing disk from the top when the valve cap is absent and allows replacement of the usual check pattern, which is a check, i.e. by feeding a signal to operate a tool, where the tool exerts a force required to remove the sealing disk in the case under consideration.

It is a further expedient, in accordance with the invention, to relieve the first set from the gripping from the top before the valve cap is attached to the valve body. This eliminates the possibility of deforming the valve cap in the first set if no second set is available, and the first set can consequently be removed with the valve cap intact for reuse during a subsequent assembling cycle.

To embody the method according to the present invention, an apparatus is disclosed incorporating a plurality of vertical holders for the first "sealing disk-valve cap" sets; means for placing the sealing disk on each said holder; means for fitting the valve cap on the sealing disk accommodated on each of said holders; a plurality of vertical receptacles with through holes disposed wherein are the second "valve body-spring-stem" sets; means for placing the valve body, hollow upwards, into each said receptacle; means for placing the spring into the hollow of the valve body disposed in said receptacle; means of placing a stem on the spring disposed in the hollow of each valve body; at least one means of gripping the first set disposed on a holder and transferring said set into a position coaxially with the second set, the means being made in the form of a gripper; at least one means of bringing the first and second sets together so as to place all of the components into the specified position relative to each other in the valve, the means being defined by a gripper, a vertical reciprocating pushing contrivance adapted to lift the second set into its receptacle, at least one means of interlinking the valve cap with the valve body by deforming the valve cap so as to assure the assembling of all the components of the valve into a single structure, the last-named means incorporating several squeezing elements which move radially at a common horizontal level for coping with said interlinking.

In the apparatus, each of the holders and receptacles are adapted, in accordance with the invention, to form the first and second sets, respectively, in sequence where each holder of the first "sealing disk-valve cap" set has a vertical bushing with a central opening and an extensible pin slidably fitting the bushing opening; the pin of the holder is adapted to fit into the bore of the sealing disk while being extended from the bushing and to align said sealing disk by means of its bore; the bushing of the holder is adapted to accommodate the sealing disk aligned with the aid of the pin of the holder whereas the gripper, reciprocates vertically so as to carry out gripping from the top and horizontally so as to cope with said transferring, is provided with a tip at its lower end adapted to pass freely through the aperture in the valve cap and fit with an interference with the sealing disk disposed on said bushing so as to grip from the top and transfer the first set retaining its original orientation into a position coaxial with the second set, the first set being disposed above the second one.

The fact that the workholding fixture of the first set is given the form of a bushing in the central opening whereof an extensible pin is being flush-fitted assures accurately fixed position of the sealing disk in forming the set.

Furthermore, the tip at the lower end of the gripper serves to grip the first set and performs another function, which is the checking of the first set for the presence of the sealing disk, for, if no sealing disk is present, no valve cap will be gripped and fed for further assembling, due to the fact that the diameter of the aperture in the valve cap exceeds the diameter of the tip.

It is a feature of the invention that the pin of the holder enters the bore of the sealing disk with an interference fit. This assures the fixing of the sealing disk relative to the pin and enables the pin to retain its extended position without any locking arrangement when the sealing disk is placed on the top end face of the bushing of the holder.

Another feature of the invention is that in the apparatus the top portion of the bushing of said holder is adapted to align the valve cap by means of its cavity. This permits a stable position to be obtained of the first set on the bushing of the holder of said set.

A further feature of the invention is that incorporated into the apparatus is a vertical continuously rotating turret with means for bringing the first and second sets together and for interlinking the valve cap with the valve body disposed on the periphery thereof so that the means travel over an endless horizontal path; a means of displacing the holders over an endless horizontal path in the form of a first endless chain conveyor running horizontally so that one of its zones is contiguous with the path along which said means are travelling; a means of displacing the receptacles over an endless horizontal path in the form of a second endless chain conveyor running horizontally so that one of its zones is also contiguous with the path along which the means are travelling. The turret incorporates an upper drum and a lower drum rigidly attached one to the other and rotates continuously about their vertical axes with upper and lower guides, respectively, spaced equidistantly along, and disposed coaxially pairwise on the periphery thereof; an upper stationary cylindrical cam and a lower stationary cylindrical cam disposed concentrically with said drums; a sprocket interposed between the drums, rigidly attached thereto and meshing with the first and second conveyors so that said contiguous zones are formed at different sides of the turret in such a manner that a number of said holders are disposed coaxially with a number of respective guides in one of the zones, whereas, a number of receptacles are disposed coaxially with a number of respective guides in the other zone. Accommodated in each upper guide is a tappet of an upper cam and located in the lower portion of the tappet is the gripper along with said means for interlinking the first and second sets. Accommodated in each lower guide is a tappet of the lower cam, whereas, a pushing contrivance is disposed in the upper portion of said tappet.

Since the gripper is provided in each of the upper guides of the continuously rotating turret, there is a practical possibility for the gripper component to perform more than one function, i.e., to grip the first set from the top and transfer same into a position coaxial with the second set. This arrangement of the apparatus is the most preferable one in the light of the fact that the valves are being assembled while the components are in the course of a continuous and steady travel and, as the result, there is no conflict between the assembling and workhandling functions of the apparatus, this problem being commonly difficult to cope with. In other words, the capacity of the apparatus arranged on the above lines is not affected by the duration of the assembling operations and is practically unlimited. It can be of a rather high order if the components to be assembled into the valves are fed into the holders and receptacles of the conveyors at a sufficiently high rate and the assembling tools are provided in a sufficient manner.

An additional feature of the invention is that the apparatus incorporates a nozzle connected to a source of compressed air, the nozzle being disposed in close proximity to the first conveyor and behind means for placing the valve cap on the sealing disk. The jet of air issued from the nozzle is directed on the first set with a force sufficing to remove sealing disks from bushings of holders if no valve caps are being fed. Thus, the sealing disk is removed in a simple way if no valve cap is provided for, without a preliminary check up for the presence of said valve cap.

Yet another feature of the invention is that in the apparatus, the gripper is so disposed relative to the lower end face of an upper drum at the end of its lift, that the end face serves as a means of removing the first sets and finished valves. The arrangement prevents the deformation of the valve cap if no second set is provided for and serves as a means of removing the finished valves from the lowermost tip of the gripper and placing them into receptacles of the second conveyor. After interlinking, the assembled valves remain in receptacles of the second conveyor as long as is required, until the conveyor arrives into a position convenient for the unloading of the finished valves from receptacles in the second conveyor into a suitable container.

It can be seen that the disclosed method of assembling aerosol valves provides for the assembly of valves with a minimum number of operations for the orientation of the components assembled. Moreover, the checking operations required by the method disclosed are rather simple, and such operation as checking for the presence of the sealing disk is omitted, although this was once regarded as an important step in assembling the valve. In the method disclosed, no preliminary interlinking of the components comprising the second "valve body-spring-stem" set is required. This reduces the assembling waste and simplifies the process of assembling. The advantages offered by the method disclosed, create the necessary prerequisites for providing a high-capacity apparatus for assembling valves. A continuous apparatus according to the invention which embodies the method is capable of operating at a rate of 400 to 1000 pieces per minute. The last-named capacity which has been already attained by an operating apparatus exceeds at least three-fold the capacity of the apparatus used for the assembling of similar valves nowadays.

The present invention will be best understood from the following detailed description of a preferred embodiment when this description is being read in conjunction with the accompanying drawings.

BRIEF DESCRIPTION OF THE DRAWINGS

FIG. I is a sectional elevation of a typical aerosol valve assembled in accordance with the invention;

FIGS. 2a through 2d, 3a through 3d, 4a through 4h and 5a through 5e are diagrammatic representations of the operations involved in realizing the method in accordance with the invention;

FIG. 6 is a diagrammatic plan view of a preferred embodiment of the apparatus in accordance with the invention, wherein:

FIGS. 6a through 6c illustrate the way the first set is being formed; FIGS. 6d through 6g show the way the second set is being formed; FIGS. 6h through 6j depict the way the first and second sets are being assembled into the valve;

Referring to FIG. 1, an aerosol valve 1 is made up of a valve body 2 with a hollow 3 wherein disposed are a spring 4 with a stem 5 and a valve cap 6 with a cavity 7 wherein disposed are a sealing disk 8 and partly the valve body 2. The sealing disk 8 has a central bore 9 and the valve cap 6, a central aperture 10, the diameter whereof being greater than the diameter of the bore 9 in the sealing disk 8. The valve is interlinked into an integral structure by deforming the valve cap 6 within the area B with the result that, the valve cap 6 fits around the sealing disk 8 and a portion of the valve body 2. The material of the valve body 2 and of the stem 5 is plastic, that of the sealing disk 8, namely, is one with resilient properties, say rubber, which enables the disk to perform its function, i.e., to seal the valve 1. The valve cap 6 is of a material which lends itself readily to deformation and can be, for example, tin or aluminium. This does not preclude, however, the use of other materials in fabricating the components of the aerosol valve.

Figure 6:
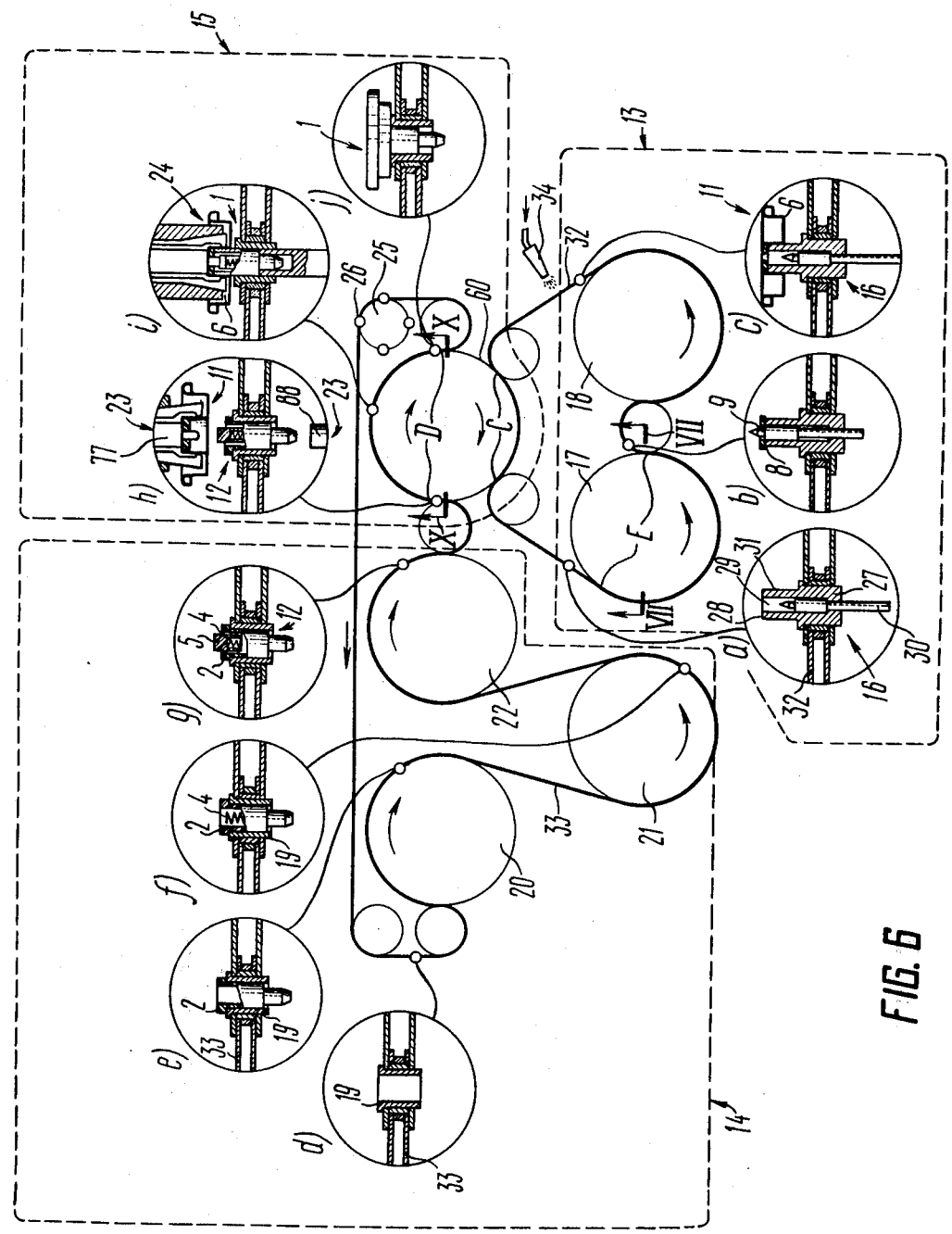

In assembling the valve 1 by the method in accordance with the invention from the components 2, 4, 5, 6 and 8 comprising the valve, a first vertical "sealing disk-valve cap" set 11 (FIG. 2) and a second vertical "valve body-spring-stem" set 12 (FIG. 3) are formed in a sequence indicated by their names.

In forming the first "sealing disk-valve cap" set 11, the sealing disk 8 is aligned by means of its bore 9 (FIGS. 2a, 2b), the ability of the sealing disk 8 to move downwards is constrained (FIG. 2c) and then the valve cap 6 is fitted on the sealing disk 8 (FIGS. 2c, 2d) with a simultaneous aligning of the valve cap 6 by means of its cavity 7. At the next stage, the sealing disk 8 (FIG. 4a) is relieved of the aligning action and the valve cap 6 is checked for presence in an obviously simple way (FIGS. 4a, 4b, 4c), a force being applied to the assembled "sealing disk-valve cap" set 11, e.g., in the form of a jet of air, sufficient to remove the sealing disk 8 if no valve cap 6 is provided for, as this is shown in FIG. 4c.

In forming the second "valve body-spring stem" set 12, the valve body 2 is placed vertically, its hollow 3 upwards (FIGS. 3a, 3b), the spring 4 is inserted into the hollow 3 of the valve body 2 (FIGS. 3b, 3c), and then the stem 5 is placed on the spring 4 (FIGS. 3c, 3d).

The first set 11 is gripped through the intermediary of the bore 9 of the sealing disk 8, the gripping action being performed from the top through the aperture 10 in the valve cap 6 (FIGS. 4d, 4e, 4f) and transferred, retaining its original orientation, into a position where it is disposed coaxially with, and above, the second set 12. At this stage, the checking of the set 11 for the presence of the sealing disk 8 is accomplished by itself, for the valve cap 6 cannot be gripped (FIGS. 4g and 4h) if no sealing disk 8 is provided for. Said sets 11 and 12 are brought towards each other (FIGS. 5a, 5b) so as to place the components into the specified position relative to each other in the valve 1, and the first set 11 is relieved of the gripping action (FIGS. 5c, 5d). This step also serves the purpose of checking the second set 12 for presence, the first set 11 being practically removed by itself if no second set 12 is provided for. If the assembling process goes on in the normal way, i.e., the sets 11 and 12 are both present, they are interlinked into the valve 1 by deforming the valve cap 6 within the area B (FIG. 5e).

Thus, the assembling of aerosol valves in accordance with the invention is carried out rather simple without changing the orientation of the components and sets assembled. In the course of said assembling, the operation of checking the sealing disk for presence is combined with an operation called for by the assembling process and a number of other checking operations are performed in a rather simple way, as this is the case when the valve cap is checked for presence.

The method employs a high-capacity apparatus for assembling aerosol valves in accordance with the invention.

The apparatus (FIG. 6) incorporates a device 13 for forming the first "sealing disk-valve cap" set 11, a device 14 for forming the second "valve body-spring-stem" set 12 and a device 15 for interlinking the sets 11 and 12 into the valve 1.

The device 13 for forming the first set 11 is provided with a plurality of vertical holders 16 (FIG. 6a) disposed equidistantly apart and travelling over a horizontal endless path so as to receive sealing disks 8 and valve caps 6 (FIGS. 6b, 6c) in succession and with respective feeding stations 17 and 18.

The device 14 for forming the second set 12 is provided with a plurality of vertical receptacles 19 (FIG. 6d) disposed equidistantly apart at a spacing as the holders 16 and travelling over another horizontal endless path so as to receive valve bodies 2, springs 4 and stems 5 (FIGS. 6e, 6f, 6g) of each second set 12 and with respective feeding stations 20, 21 and 22.

The device 15 for interlinking the sets 11 and 12 into the valve 1 (FIG. 6h, 6i) is provided with means 23 for bringing the sets one towards the other so as to place the components into the specified position relative to each other in the valve 1 and with means 24 for deforming the valve cap 6. The means 23 and 24 are made travelling over horizontal endless paths each of which has in plan zones C and D, respectively, wherein said paths are contiguous with the paths of the holders 16 and the receptacles 19, respectively.

The finished valves 1 are left (FIGS. 6, 6j) in their receptacles 19 until the moment arrives when they are unloaded in a container (not shown) by known means suitable for this purpose; this means can be, for example, a rotating table 25 fitted with vertical lifters 26.

The drive is obtained from an electric motor of a known kind through a train of gears (not shown).

Each holder 16 (FIGS. 6a, 6b) is represented in the form of a bushing 27 whose upper end face 28 is adapted to accommodate the sealing disk 8 thereon. Disposed in an axial opening 29 of the bushing 27 is an extensible pin 30 adapted to receive and align the sealing disk 8 by entering its bore 9 (FIGS. 2a, 2b). The top portion of the pin 30 is shaped in cross section so that the pin fits the bore 9 of the sealing disk 8 with an interference, this being achievable by giving a portion of the pin 30 a diameter slightly exceeding the diameter of the bore 9 of the sealing disk 8. The top portion 31 of the bushing 27 (FIGS. 6a) is shaped in cross section so as to assure the alignment of the valve cap 6 by means of its cavity 7 (FIG. 2c), this being achievable by giving the top portion 31 of the bushing 27 a diameter slightly smaller than the diameter of the cavity 7 in the valve cap 6.

Each receptacle 19 (FIG. 6d) is represented in the form of a through socket adapted to accommodate the valve body 2 therein (FIG. 6e).

To impart to the holders 16 and the receptacles 19 motion over their horizontal endless paths, use is made of a first chain conveyor 32 and a second chain conveyor 33, respectively, the holders 16 and receptacles 19, respectively (FIGS. 6a, 6d) being fitted into their links.

In close proximity to the first conveyor 32 and behind the feeding station 18, there is provided a nozzle 34 connected to a supply of compressed air. The jet of air issuing from the nozzle 34 is directed towards the first set 11 and its force is sufficient to remove the sealing disk 8 from the holder 16 if no valve cap 6 is fitted on the sealing disk 8.

Suitable for use as the feeding stations 17, 18, 20, 21 and 22 of the devices 13 and 14 (FIG. 6) are any known and available means of feeding articles of the corresponding kind capable of assuring the functioning of the apparatus disclosed. This applies, for example, to the feeding means disclosed in U.S. Pat. No. 2,506,175. A point to be noted is that the construction of the feeding stations is not included as part of the present invention but the principle whereon they are based is important in order to understand the way in which the apparatus disclosed operate. The feeding stations employed in the apparatus are of a construction described hereinafter when the feeding station 17 for handling sealing disk is considered as an example.

Figure 7:
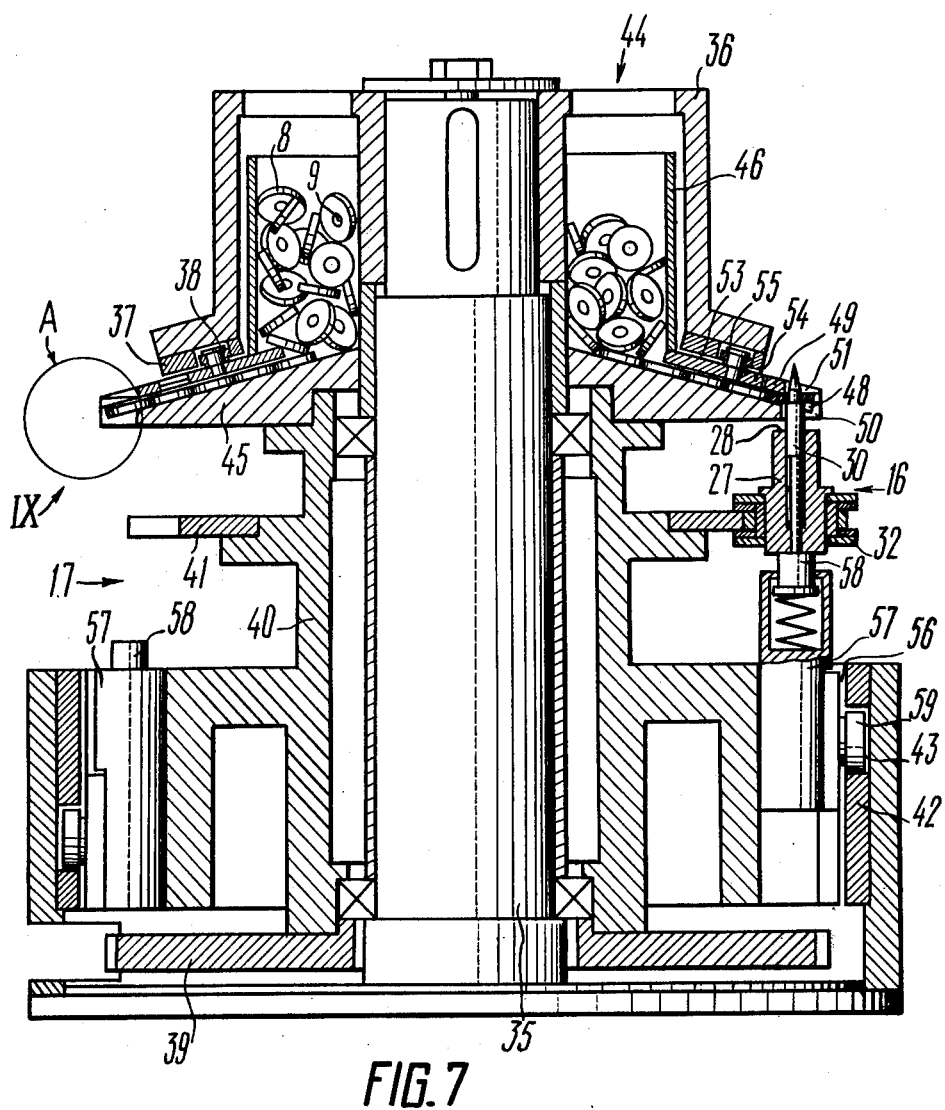
FIG. 7 is a section on line VII—VII of FIG. 6 showing the device for feeding sealing disks in an embodiment given preference in the apparatus disclosed.

FIG. 7 illustrates the feeding station 17 made as a continuosly rotating turret supplying sealing disks 8 onto the holders 16 of the conveyor 32. Rigidly attached to the top of a static post 35 of the feeding station is a casing 36. Fitted at the bottom of the casing 36 is a tapered cam 37 with a groove 38. A gear 39 rigidly attached to a drum 40 is provided at the base of the post 35 with provision for rotation thereabout. The gear 39 is in mesh with the drive (not shown) of the apparatus.

The drum 40 is rigidly attached to a sprocket 41, and a stationary cylindrical cam 42 with a groove 43 is fitted concentrically with the drum 40 and rigidly attached to the post. Topping the drum 40 and rigidly attached thereto, is a hopper 44 with a slanting bottom 45 and a shell 46 so that the stationary tapered cam 37 is disposed above the bottom 45 of the hopper 44 stored wherein are sealing disks 8. The bottom 45 of the hopper 44 is provided with radial grooves 47 (FIG. 8) of a width somewhat exceeding the outside diameter of the sealing disk 8. At the periphery of the bottom 45, the grooves are constricted in width by projections 48 which prevent the sealing disk 8 from leaving the groove. Each of the grooves 47 is overlaid with a plate 49 (FIG. 9) and has a through vertical slot 50 (FIG. 7) within the area where the projection 48 is found. In the same place, the plate 49 (FIG. 9) is provided with a recess 51 which is congruent with the slot 50 and a bevel 52. Furthermore, each of the plates 49 has a guide 53 fitted with a slide 54 with a roller 55, the roller fits into the groove 38 of the cam 37 so that the slide 54 serves as the tappet of the cam 37. Each of the radial grooves 47 in conjunction with the plate 49 and the slide 54 performs the function of the orienting and feeding arrangement of the rotary feeding station 17.

At the periphery of the drum 40 (FIG. 7) below the slots 50 and the recesses 51 are vertical guides 56 each accommodating a slide 57 with a spring-loaded insert 58. The slide 57 is provided with a roller 59 fitting into the groove 43 of the cam 42 so that the slide 57 serves as the tappet of the cam 42. The spacing of the adjacent slides 57 measured along the arc is equal to the spacing of the adjacent holders 16 of the conveyor 32. The sprocket 41 meshes with the conveyor 32 so that the holders 16 are disposed, within the arc E (FIG. 6), coaxially and above the slides 57 (FIG. 7).

Figure 10:
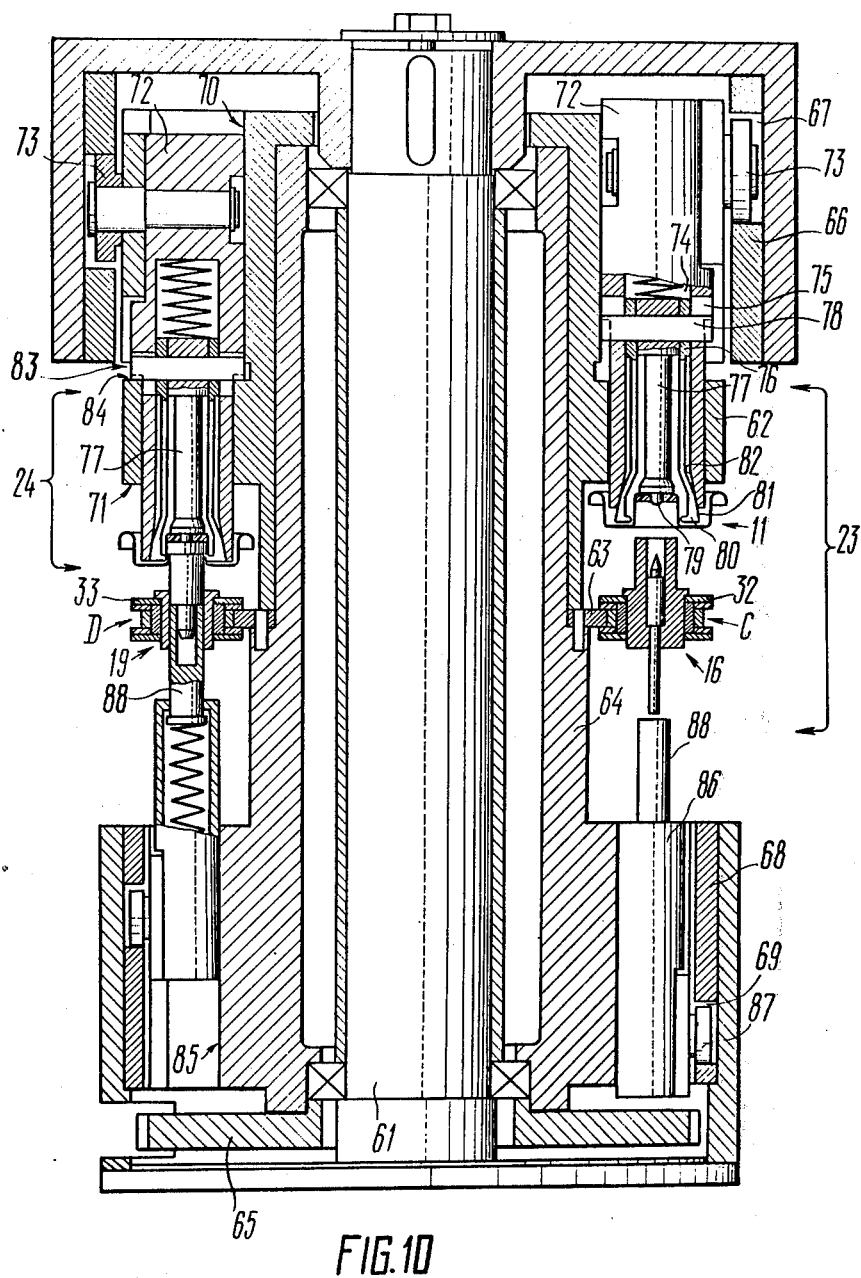
FIG. 10 is a section on line X—X of FIG. 6 showing the turret of the apparatus according to the invention.

For moving the means 23 (FIG. 6) and 24 over their endless paths, the device 15 serving to assemble the sets into the valve is provided, according to the invention, in the form of continuously rotating turret 60 (FIG. 6) the construction of which is illustrated in FIG. 10. Disposed on a static post 61 of turret 60 with provision for rotation thereabout, are an upper drum 62, a sprocket 63, a lower drum 64 and a gear 65 rigidly attached one to the other. The gear 65 meshes with the drive (not shown) of the apparatus. A stationary cylindrical cam 66 with a groove 67 is fitted concentrically with the upper drum 62, and a stationary cylindrical cam 68 with a groove 69 is fitted concentrically with the lower drum 64.

Disposed at the inner periphery of the upper drum 62 equidistantly apart all the way around the circumference are upper guides 70. The lower end face of the upper drum 62 is shown at 71 being also the end face of the guides 70. In each upper guide 70 of the upper drum 62 is an upper slide 72 which is fitted with a roller 73 and serves as the tappet of the cam 66. Each slide 72 is provided with a deep recess 74 at its lower end and with a slot 75. Disposed in the recess 74 are a collet 76 and a gripper 77 in the form of a rod, both spring-loaded and rigidly attached to each other by a cross piece 78. The gripper 77 is provided with a tip 79 at its lower end adapted to fit the bore 9 of the sealing disk 8 with an interference. To that end, the diameter of the tip 79 is somewhat in excess of that of the bore 9 of the sealing disk 8 (FIGS. 4D, 10).

The gripper 77 moves axially up and down and is disposed at the end of its upstroke so with respect to the end face 71 of the upper drum 62, its lowermost tip 79 is above the end face 71.

The collet 76 is fitted with a number of radial squeezing elements 80 with tapered outside surfaces 81 (FIG. 10). The lower end of the recess 74 also has a tapered surface 82 congruent with the surfaces 81 of the squeezing elements 80. Machined in the upper drum 62 is a groove 83 with a lower end face 84.

Arranged at the periphery of the lower drum 64 equidistantly apart around the circumference are lower guides 85 which are coaxial with the upper guides 70 of the upper drum 62. In each lower guide 85 is a lower slide 86 which is fitted with a roller 87 and serves as the tappet of the cam 68. Each slide 86 carries a pushing element 88 in the form of a rod which is spring-loaded upwards and reciprocates axially up and down relatively to the gripper 77.

Each upper slide 72 with the gripper 77 fitted thereinto forms, in conjunction with the coaxial lower slide 86 carrying the pushing contrivance 88, the means 23 for bringing the sets 11 and 12 towards each other, to place the components into the specified position relative to each other in the valve 1.

Each tapered surface 82 of the recess 74 in the upper slide 72 forms, in conjunction with the respective collet 76 and the cross piece 78, the means 24 for deforming the valve cap 6.

The sprocket 63 (FIG. 10) is disposed between the upper drum 62 and the lower drum 64 and is in mesh with the first conveyor 32 and the second conveyor 33 so that the zones C and D of contiguous paths are formed at different sides of the turret 60 as shown in FIG. 6. While a number of holders 16 are disposed in the zone C coaxially with a number of guides 70 and 85, a number of receptacles 19 are disposed in the zone D coaxially with a number of guides 70 and 85.

The apparatus operates on the following lines. When the drive (not shown) is set running, it imparts rotary motion to the gears of the rotary feeding stations 17, 18, 20, 21, 22 and of the turret 60 (FIG. 6), particularly to the gear 39 (FIG. 7) and the gear 65 (FIG. 10); also the conveyors 32 and 33 are set into motion throught the intermediary of sprockets, i.e., the sprocket 41 (FIG. 7) and the sprocket 63 (FIG. 10), said turret and conveyors moving in synchronism.

Figure 8:
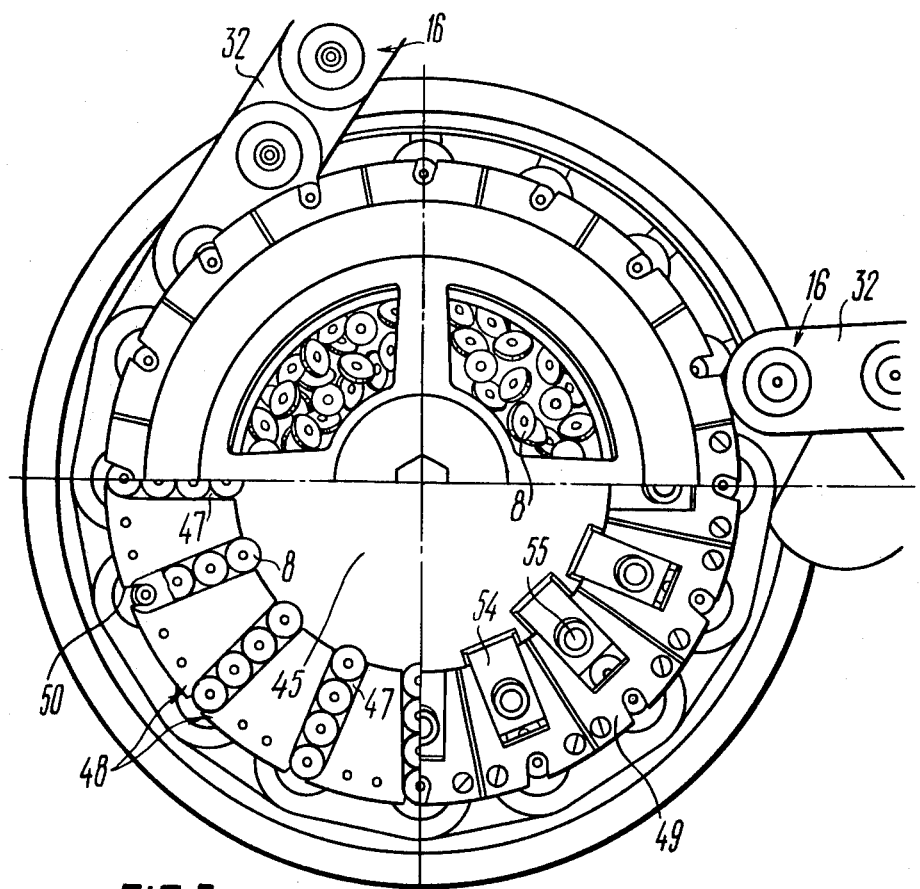
FIG. 8 is a plan view of FIG. 7 showing the device for feeding sealing disks.
Figure 9:
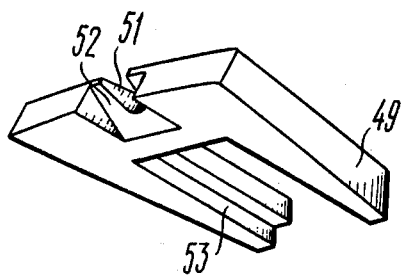
FIG. 9 is a bottom view in the direction of arrow IX in FIG. 7 showing a three-dimensional fragment of unit A.

The first "sealing disk-valve cap" sets 11 are formed on holders 16 of the conveyor 32 (FIG. 6), the rotary feeding station 17 feeding a sealing disk 8 on each holder 16 of the conveyor 32 in the following way (FIG. 7). The drive gear 39 rotates the drum 40 integrally with the sprocket 41 meshing with the conveyor 32 and with the bottom 45 of the hopper 44. The rollers 55 of the slides 54, each interact with the groove 38 in the stationary cam 37, causing the slides to reciprocate radially so as to stir the sealing disks 8 in the hopper 44 and facilitate the entering of some disks into a grooves 47 wherein they travel over the slanting bottom 45 of the hopper 44 towards the periphery thereof. In the grooves 47, the sealing disks 8 reach the slots 50 one after another, and abut against the projections 48 which prevent the sealing disks from leaving the grooves. Within the length of the arc E formed where the conveyor 32 passes around the rotary feeding station 17, the rollers 59 of the slides 57 interact with the groove 43 of the stationary cylindrical cam 42, causing the slides 57 to move upwards by an amount which brings the inserts 58 in contact with the pins 30 of the holders 16. Further travel of the slides 57 upwards results in the lifting of the pins 30 which enter the bores 9 of those sealing disks 8 which overlay the slots 50 at that moment (FIGS. 2a, 2b, 7). The pins 30 lift the sealing disks 8 out of the grooves 47 and abut them against the bevels 52 of the plates 49, the projections 48 prevent any other sealing disks from leaving the grooves 47 (FIGS. 7,8,9). Since the diameter of the pins 30 is somewhat greater than that of the bores 9 of the sealing disks 8 (FIG. 2b), the sealing disks 8 are aligned through the intermediary of their bores 9. As the drum 40 continues rotating and the first conveyor 32 is also continuing its travel, the holders 16 with the sealing disks 8 on the pins 30 leave the rotary feeding station 17. At this stage, the pins 30 with the sealing disks 8 cease to interact with the inserts 58 of the slides 57 and simultaneously with the slots 50 (FIG. 7). While the pins 30 settle down due to gravity, the sealing disks 8 are placed on the top end faces 28 of the bushings 27 of the holders 16, and the pins 30 are prevented from settling further down by the fact that their diameter exceeds the diameter of the bores 9 of the sealing disks 8 (FIGS. 6a, 6b). This constrains the ability of the sealing disks 8 to move downwards and keeps them firmly on the end faces 28 of the bushings 27 of the holders 16 where the pins 30 prevent the sealing disks 8 from sidewise movement. The aligning of the sealing disks through their bores 9 with the constraint on their ability to move downward, assures accurate fixing of the sealing disks 8 on the holders 16 and allows the valve caps 6 to be fitted on the sealing disks 8.

When the conveyor 32 (FIG. 6) with the holders 16 passes around the rotary feeding station 18, valve caps 6 are fed therefrom in succession onto the sealing disks 8 in the known way so that each valve cap fits the bushing 27 of the holder 16 with its cavity 7 while the sealing disk 8 is laying on the top end face 28 of said bushing. The valve caps 6 become thus aligned on the bushings 27 of the holders 16 through the intermediary of their cavities 7, this assuring a stable position of the first "sealing disk-valve cap" sets 11 on the holders 16 (FIGS. 2c, 2d). Once the valve caps 6 have been fitted, the pins 30 in the rotary feeding station 18 are lowered by any known means back into the bushings 27 of the holders 16 (FIG. 6c), thus relieving the sealing disks 8 of the aligning action and creating the prerequisites for the gripping of the first sets 11. On passing the rotary feeding station 18, a jet of air issuing from the nozzle 34 (FIG. 6) easily removes those sealing disks 8 which lack their valve caps 6, on the respective bushings 27 of the holders 16. Thus, the first "sealing disk-valve cap" sets 11 are already present on the holders 16 in the zone C of the first conveyor 32 when said conveyor passes over the turret 60.

The second "valve body-spring-stem" sets 12 are formed by feeding in succession from the rotary feeding stations 20, 21 and 22 into each receptacle 19 of the conveyor 33. Within the receptacle 19 are the following components; a valve body 2 (FIGS. 6d, 6e), a spring 4 fitted into the valve body 2 (FIG. 6f) and a stem 5 fitted on the spring 4 (FIG. 6g). The rotary feeding stations 20, 21 and 22 operate in the way described hereinabove. Thus, the second "valve body-spring-stem" sets 12 are already present in the receptacles 19 in the zone D of the second conveyor 33 when said conveyor passes over the turret 60.

The operation of assembling and interlinking the sets 11 and 12 into an inseparable structure of the valve is carried out on the turret 60 in the following way.

In the zone C of the turret 60 (FIGS. 10, 11a), the first conveyor 32 with its holders 16 have the first "sealing disk-valve cap" sets 11 disposed between the upper guides 70 and the lower guides 85. The upper and lower drums 62 and 64 are rotated by drive gear 65, as well as the sprocket 63 meshing with the conveyors 32 and 33. The rollers 73 of the upper slides 72, interacting in the zone C of the turret 60 with the groove 67 of the stationary cylindrical cam 66, cause the upper slides 72 to move down in the upper guides 70 so that the tips 79 at the ends of the grippers 77 enter the bores 9 of the sealing disks 8 with an interference from the top through the apertures 10 of the valve caps 6 belonging to the first sets 11 accommodated on the holders 16 of the conveyor 32 (FIGS. 4d, 4e, 11b).

The operation poses no problems due to the fact that the diameter of the tips 79 is slightly less than the diameter of the apertures 10 in the valve caps 6 and slightly greater than the diameter of the bores 9 of the sealing disks 8. The effort required to insert the tips 79 into the bores 9 of the sealing disks 8 is not great since the sealing disks 8 are made of a resilient material.

Figure 11:
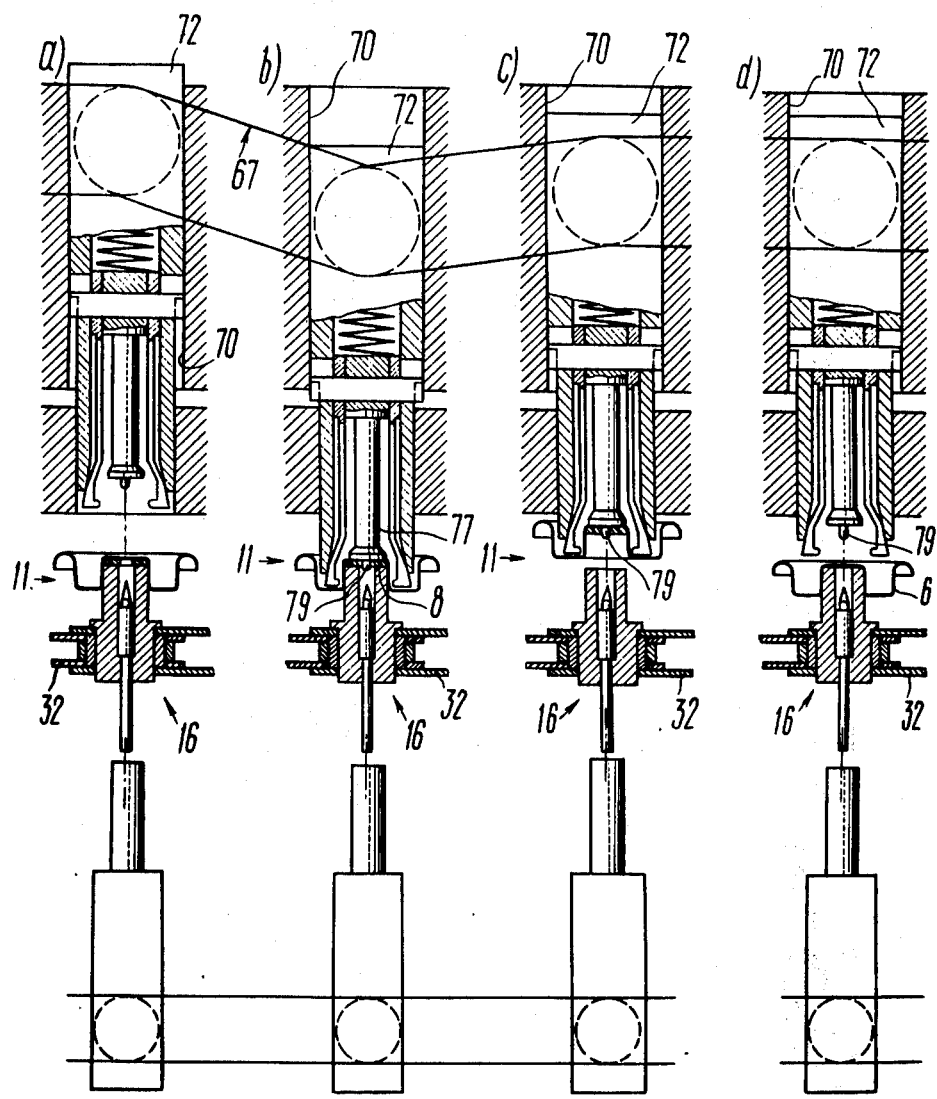
FIGS. 11a through 11d are diagrammatic views of zone C of the turret wherein it meshes the first conveyor.

As the upper drum 62 continues rotating, the stationary cylindrical cam 66 causes the upper slides 72 to lift in their guides 70 so that the tips 79 inserted into the bores 9 of the sealing disks 8 take hold of the first sets 11 (FIGS. 4f, 10, 11c). This operation excludes the necessity to check the first sets 11 for the presence of the sealing disks 8 (FIGS. 4g, 4h, 11d) for the obvious reason that no valve cap 6 can be gripped by the tip 79 unless a sealing disk 8 is provided for and the valve caps lacking sealing disks are left behind on their holders 16 of the first conveyor 32.

Figure 12:
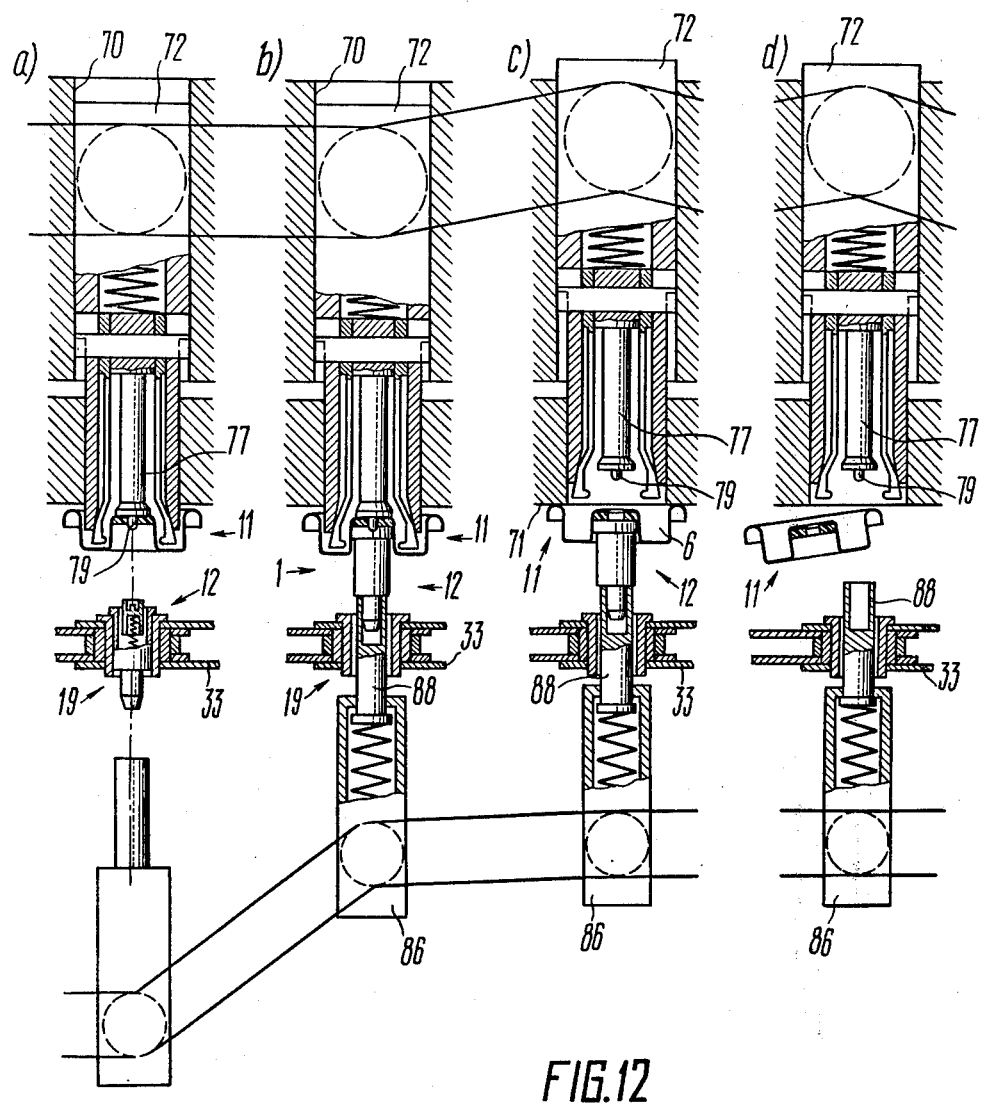
FIGS. 12a through 12d and FIGS. 13a through 13d are diagrammatic views of zone D of the turret wherein it meshes with the second conveyor.
Figure 13:
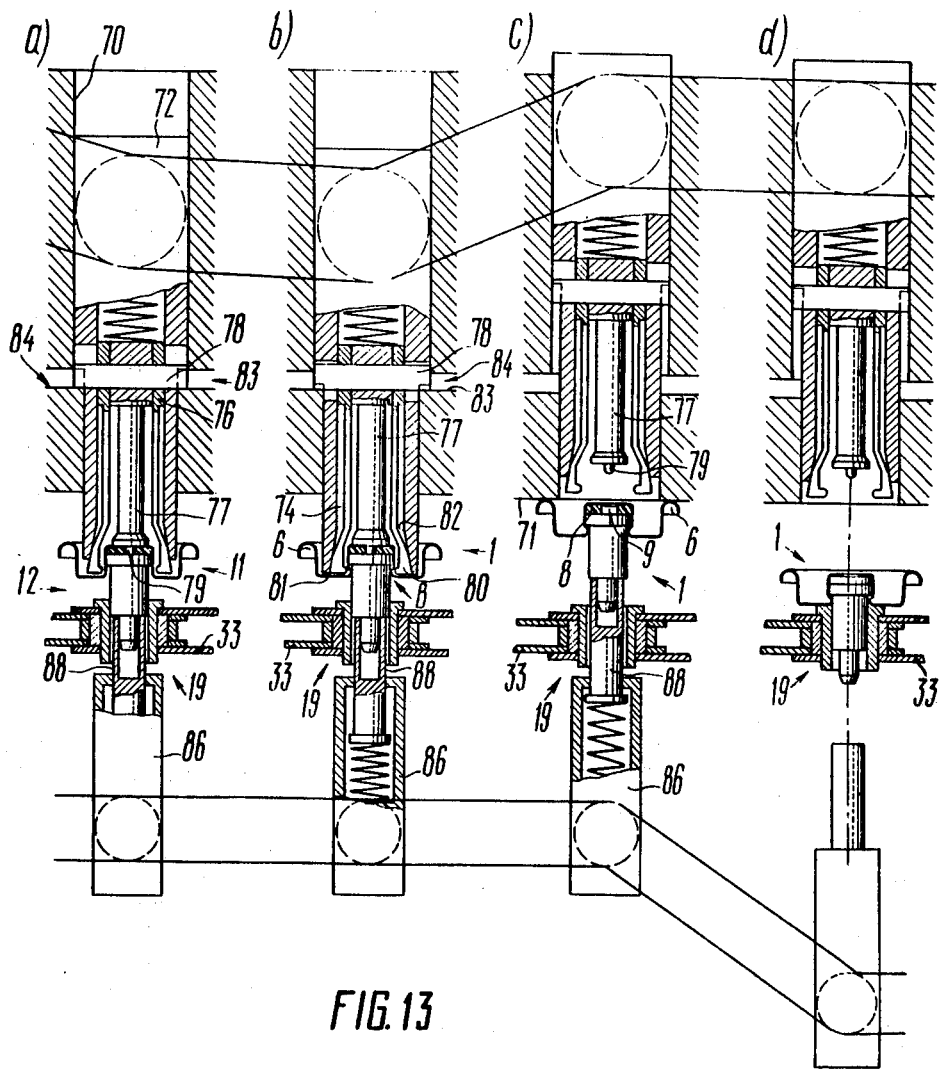

In the course of a further rotation of the upper drum 62, the upper slides 72 with the first sets 11 that have taken hold of, are displaced into the zone D from the zone C (FIGS. 5a, 10). In the zone D, the second conveyor 33 with its receptacles 19 accommodated wherein are the second "valve body-spring-stem" sets 12 disposed between the upper guides 70 and the lower guides 85, and, furthermore, in the same zone, the first sets 11 accommodated on the lowermost tips 79 of the grippers 77 are disposed coaxially with, and above, the second sets 12 (FIG. 12a). At this stage, sets 11 and 12 are being brought in pairs so as to place all the components into a specified position one relative to the other, in the valve 1. To that end, upper slides 12 integral with the first sets 11 move downwards under the action of the stationary cylindrical cam 66 whereas, the rollers 87 of lower slides 86 interact with groove 69 in the stationary cylindrical cam 68 so that the lower slides 86 move upwards with the result that the pushing contrivances 88 enter the receptacles 19 and lift the second sets 12 in the receptacles 19 of the second conveyor 33 and to place all the components into the specified position relative to each other in the valve 1 (FIGS. 10, 12b). The sets 11 and 12 brought together, are then lifted into a position where the valve caps 6 come abutting into the end face 71 of the upper drum 62 while the lowermost tips 79 of the grippers 77 are withdrawn from the bores 9 of the sealing disks 8 (FIGS. 5c, 12c) due to the continuing lift of the upper slides 72 in the upper guides 70. This simple operation checks the second sets 12 for presence and if any of the second sets 12 are not available, the first set matching the missing second set drops into a tray (not shown in FIGS. 5d, 12d). During normal operation the upper slides 72 acted upon by the stationary cylindrical cam 66 move downward and the lowermost tips 79 enter the bores 9 of the sealing disks 8 (FIGS. 10, 13a). The cross pieces 78 abut against the end face 84 of the groove 83 machined in the upper drum 62, causing the grippers 77 and the collets 76 to cease their travel downwards, while the upper slides 72 continue this downward movement in their guides 70 (FIGS. 10, 13b). The tapered surfaces 82 of the recesses 74 in the slides 72 act upon the tapered outside surfaces 81 of the radial squeezing elements 80 incorporated into the collets 76 so that tips 79 enter the bores 9 of the sealing disks 8 (FIGS. 10, 13a). The cross pieces 78 abut against the end face 84 of the groove 83 machined in the upper drum 62, causing the grippers 77 and the collets 76 to cease their travel downward, while the upper slides 72 continue downward movement in their guides 70 (FIGS. 10, 13b). The tapered surfaces 82 of the recesses 74 in the slides 72 act upon the tapered outside surfaces 81 of the radial squeezing elements 80 incorporated into the collets 76 so that the valve caps 6 are deformed within the zones B, interlinking the valves each into an integral structure. After that, the upper slides 72 lift again and so do the lower slides 86 (FIG. 13c). The assembled valves 1 come abutting with their valve caps 6 against the end face 71 of the upper drum 62 and that the lowermost tips 79 of the grippers 77 are withdrawn from the bores 9 of the sealing disks 8. The lower slides 86 settle down into the original position, and the finished valves 1 settle down into the receptacles 19 of the second conveyor 33, leaving the zone D integrally with same (FIG. 13d). As soon as the receptacles 19 of the second conveyor 33 containing the assembled valves 1 arrive at the rotating table 25 (FIG. 6), the finished products are unloaded from the apparatus. This can be obviously achieved by ejecting each valve 1 from its receptacle 19 into any suitable container. After that the above cycle of operation is repeated.

What is claimed is:

1. A method for assembling an aerosol valve made up of a number of components comprising a valve body with a central hollow wherein are disposed a spring and a stem, a sealing disk formed from a resilient material which has a central bore and is disposed on said stem and said valve body, a valve cap with a central aperture and a cavity, the diameter of said aperture exceeding that of the bore of said sealing disk and said cavity accommodating said sealing disk and a top portion of said valve body; said valve cap is rigidly attached to said valve body by deforming the valve cap; said method including the following steps:
   forming from said components a first vertical "sealing disk-valve cap" set in a sequence defined by:
   aligning said sealing disk by means of its bore;
   constraining the ability of said sealing disk to move downwards,
   placing said valve cap on said sealing disk; and
   forming from said components a second vertical "valve body-spring-stem" set in a sequence defined by:
   disposing said valve body vertically, hollow upwards,
   fitting said spring into the hollow of said valve body,
   placing said stem on said spring accommodated in the hollow of said valve body;
   assembling said first and second vertical sets into said aerosol valve by
   relieving the sealing disk of said first set from said aligning,
   gripping said first set by means of the bore of said sealing disk from the top through the aperture in said valve cap and transferring said first set while retaining its original orientation into a position coaxially with said second set by placing said first set above said second set,
   bringing said first and second sets one towards the other so as to place all said components into the specified position relatively to each other in said valve, and
   attaching said valve body to said valve cap by deforming said valve cap, assuring thereby the assembling of all said components into an integral structure of the valve.

2. A method as claimed in claim 1 wherein said valve cap is aligned by means of its cavity while said placing of the valve cap on the sealing disk is being performed.

3. A method as claimed in claim 1 wherein preparatory to said gripping from the top a force is applied to the first set sufficing to remove said sealing disk if no said valve cap is available so that the gripping of said first set is excluded when no said valve cap is present.

4. A method as claimed in claim 1 wherein said first set is relieved from said gripping from the top before said attaching of the valve cap to the valve body so that the deforming of the valve cap in said first set is eliminated when no said second set is present.

5. An apparatus for assembling the aerosol valve made up of a number of components comprising valve body with a central hollow wherein disposed are a spring and a stem, a sealing disk formed from a resilient material which has the central bore and is disposed on said stem and said valve body, a valve cap with a central aperture and the hollow, the diameter of said aperture exceeding that of the bore of said sealing disk and said hollow accommodating said sealing disk and the top portion of said valve body; said valve cap is rigidly attached to said valve body by deforming the valve cap: comprising:
   a plurality of vertical holders each adapted for forming thereon from said components of the valve the first "sealing disk-valve cap" set in a sequence, spaced equidistantly apart and travelling over an endless horizontal path:
   each of said vertical holders provided with a vertical bushing with a central opening and an extensible pin flush-fitted in the opening of said bushing;
   a pin of said holder adapted to enter the bore of said sealing disk while being extended from the bushing of said holder and align said sealing disk through the intermediary of said bore;
   a bushing of said holder adapted for accommodating thereon said sealing disk aligned with the aid of the pin of said holder;
   a means of placing said sealing disk on the pin of said holder;
   a means of placing said valve cap on said sealing disk accommodated on each said holder;
   a plurality of vertical receptacles with through holes each adapted for forming therein from said components of the valve the second "valve body-spring-stem" set in a sequence, spaced equidistantly apart and travelling over an endless horizontal path;
   a means of placing said valve body, hollow upwards, into each said receptacle;
   a means of fitting said spring into the hollow of said valve body accommodated in each of said receptacles;
   a means of placing said stem on said spring accommodated in the hollow of said valve body;
   at least one means of gripping said first set disposed on said holder, said gripping being performed from the top by entering the bore of said sealing disk through the aperture in the valve cap, and transferring said first set so that its original orientation is retained into a position coaxially with said second set by placing said first set above said second set;

said means of gripping made in the form of a gripper, reciprocating vertically so as to carry out said gripping from the top and horizontally so as to cope with said transferring;

said gripper provided with a tip at its lower end adapted to pass freely through the aperture in said valve cap and fit with an interference fit with said sealing disk;

at least one means of bringing said first and second sets together so as to place all said components into the specified position relatively to each other in the valve, said means being given the form of a combination comprising;

said gripper;

a vertical reciprocating pushing contrivance adapted to lift said second set in said receptacle;

at least one means of interlinking said valve cap with said valve body by deforming the valve cap so as to assure the assembling of all the components of the valve into a single structure, said last-named means being given the form of a squeezing device incorporating several squeezing elements which move radially at a common horizontal level for coping with said interlinking.

6. An apparatus as claimed in claim 5 wherein the pin of said holder is adapted to enter the bore of said sealing disk with an interference fit.

7. An apparatus as claimed in claim 5 wherein the top portion of the bushing of said holder is adapted to align said valve cap by means of its cavity.

8. An apparatus as claimed in claim 5 incorporated wherein are a vertical continuously rotating turret with said means of bringing said first and second sets together and said means of interlinking said valve cap with said valve body disposed on the periphery thereof so that said means travel over an endless horizontal path;

a means of displacing said holders over an endless horizontal path in the form of a first endless chain conveyor running horizontally so that one of its zones is contiguous with said path along which said means are travelling;

a means of displacing said receptacles over an endless horizontal path in the form of a second endless chain conveyor running horizontally so that one of its zones is also contiguous with said path along which said means are travelling;

said turret, a comprising:

an upper drum and a lower drum rigidly attached one to the other and rotating continuously about their vertical axes with upper and lower guides, respectively, spaced equidistantly along, and coaxially pairwise on, the periphery thereof;

an upper stationary cylindrical cam and a lower stationary cylindrical cam disposed concentrically with said drums;

a sprocket interposed between said drums, rigidly attached thereto and meshing with said first and second conveyors so that said contiguous zones are formed at different sides of the turret in such a manner that a number of said holders are disposed coaxially with a number of respective guides in one of said zones whereas a number of said receptacles are disposed coaxially with a number of respective guides in the other said zone;

accommodated in each said upper guide is a tappet of said upper cam and located in the lower portion of said tappet is said gripper along with said means of interlinking said first and second sets;

accommodated in each said lower guide is a tappet of said lower cam whereas said pushing contrivance is disposed in the upper portion of said tappet.

9. An apparatus as claimed in claim 8 incorporated wherein is a nozzle connected to a source of compressed air, said nozzle being disposed in close proximity to said first conveyor and behind said means of placing said valve cap on said sealing disk and issuing a jet of air directed on said first set with a force sufficient to remove said sealing disks from the bushings of said holders if no said valve caps are being fed.

10. An apparatus as claimed in claim 8 wherein said gripper is so disposed relative to the lower end face of said upper drum at the end of its lift that said end face serves as a means of removing said first sets and the finished valves.

* * * * *